Sept. 4, 1923.
R. B. FOORD
ENGINEER'S STETHOSCOPE
Filed Sept. 21, 1920
1,466,825
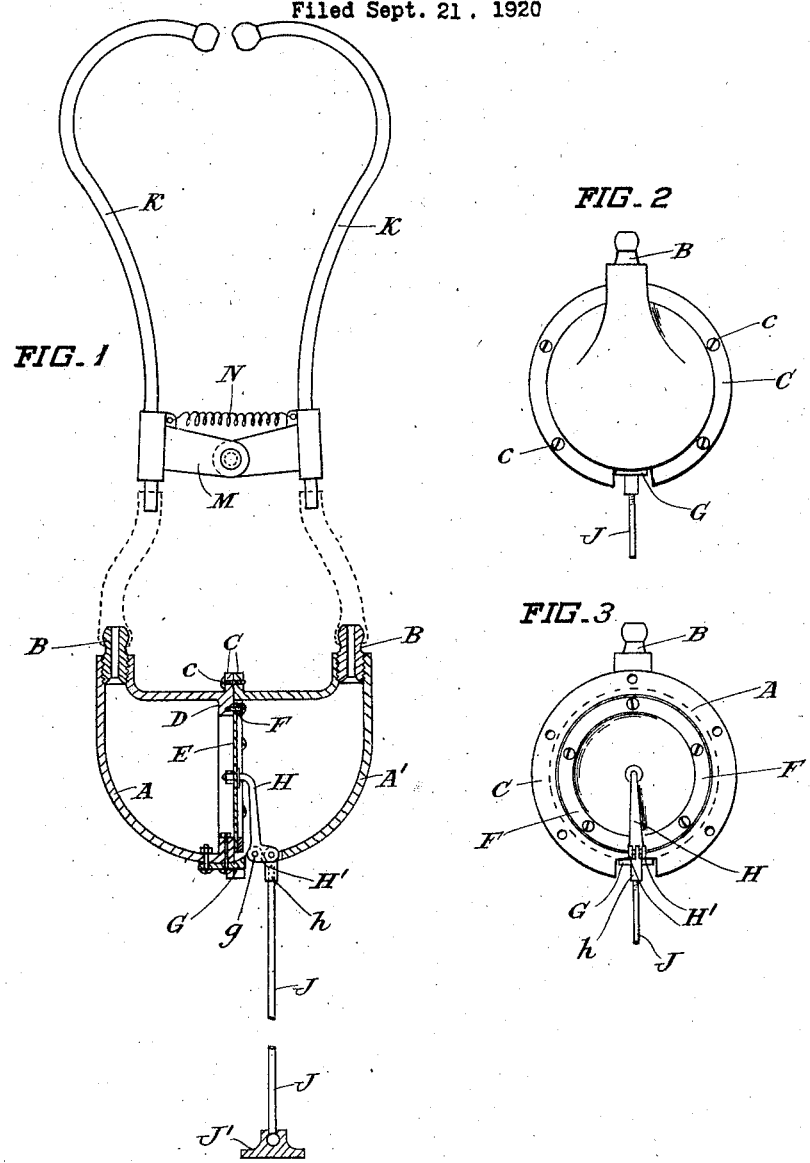

Patented Sept. 4, 1923.

1,466,825

UNITED STATES PATENT OFFICE.

RICHARD BATCHELOR FOORD, OF ELTHAM, TARANAKI, NEW ZEALAND, ASSIGNOR TO CYRIL LOUIS WILSON, OF ELTHAM, TARANAKI, NEW ZEALAND.

ENGINEER'S STETHOSCOPE.

Application filed September 21, 1920. Serial No. 411,756.

*To all whom it may concern:*

Be it known that I, RICHARD BATCHELOR FOORD, subject of the King of Great Britain, residing at Eltham, Taranaki, in the Dominion of New Zealand, have invented new and useful Improvements in Engineers' Stethoscopes, of which the following is a specification.

This invention relates to an improved stethoscopic instrument for use by engineers and others in detecting by the magnification of sounds and vibrations any faults in machinery, during the running thereof, and caused by defects in construction or wear of the parts or by the presence of foreign matter amongst them.

The invention consists broadly in constructing the instrument with a vibratory diaphragm held in position between two ear tubes and having combined therewith a sounding post that is connected to the diaphragm by means of a lever designed to amplify the sounds transmitted to the diaphragm from the sounding post and reproduced through the vibrations thereof.

The construction by means of which the invention is carried out is shewn in the accompanying drawings and will be hereinafter fully described in relation thereto.

In such drawings:—

Figure 1 is a side elevation of the whole appliance the sound collector and reproducer portion thereof being shewn in section.

Figure 2 is an end elevation of the appliance with the ear pieces removed.

Figure 3 is a cross sectional elevation thereof, looking from the right of Figure 1.

According hereto a casing of vulcanite or other approved material is made in two halves A and A' each of cylindrical form open at one end and at the other tapering down to small diameters and turned upward at right angles to the axis of the cylinder to form a duct. Each such duct then has a plug B secured within it. The open end of each portion of the casing is made with the annular flange C so that the two halves may be brought together and secured by screws $c$ or the like passing through these flanges in the manner shewn in Figure 1. Other means of assembling the two halves together may, however, be employed.

One of the casing halves A is formed also with an annular ledge D extending inward at its open end and upon this ledge a diaphragm E of mica sheet, or other approved microphonic material, is secured so as to cover the area of the opening in this end. Such sheet is secured in any approved way, as for instance by means of the clamping ring F fitting over its edge and screwed to the ledge D, strips of sound insulating packing being interposed between the diaphragm edge and the ledge and the ring respectively. The diaphragm, when the two halves are fastened together thus divides them from one another.

A bell crank lever is provided and pivoted at $g$ to a bearing piece G fastened to the outside of the half A of the casing, and extending across through an opening in the flanges C into a slot $a$ formed in the wall of the casing half A'. This bell crank lever has a long arm H arranged to extend inwards into the casing and its inner end is then attached firmly to the centre of the diaphragm E. It also has a short arm H' extending within the slot $a$ and at right angles to the arm H. To this latter arm the upper end of a rod J is secured the said rod being of rigid form and constituting the sounding post beforementioned. The lower end of this sounding post is furnished with the foot J' connected thereto by universal joint so that it may be laid flat upon any surface whether such surface is at right angle or otherwise with the line of the post.

Vibrations or sounds in any part of running machinery upon which the sounding post is placed will therefore be conveyed through such post and the bell crank lever H—H' to the diaphragm E and will cause such diaphragm to vibrate in consonance therewith. These vibrations however will be considerably amplified by the differential leverage of the bell crank lever arms, so that the vibratory resonance of the diaphragm may be readily heard and any want of harmony therein such as would be produced by irregularity or interference with the regular sound, such as would be produced by foreign matter in bearings, wear in bearings, or other faults, readily distinguishable by the expert ear.

The apparatus thus constructed is designed to be used with ear pieces and tubes K—K' of the ordinary stethoscope type which are respectively connected at their lower ends to the two plugs B by means of rubber tubes (indicated by dotted lines) of any approved length. These tubes K—K' may however be pivotally connected to one another, as at M and spring controlled by the spring N so that when opened out and placed in the user's ears they will be held therein and thus leave the user's hands free to manipulate the appliance.

The article produced is thus of great sensitiveness in its location of faults by the sound thereof. It is also of light weight and may be packed into small compass by disconnecting the ear tubes and the sounding post, so that it is convenient to carry about and may be readily assembled in condition for use. To permit of this disconnection of the sounding post it is arranged to screw into a socket $h$ extending downward from the arm H' of the bell crank lever.

I claim:—

1. An engineer's stethoscope comprising a divided cylindrical hollow casing, each half being provided with an upwardly turned tapering end forming a sound duct, a vibratory diaphragm secured to and supported by an annular ledge, provided at the inner end of one casing half, a bell-crank lever pivoted to one casing half, and having its longer arm attached to the said diaphragm at the center thereof, a sounding post pivotally connected to the shorter arm of the said bell-crank lever, and a foot piece connected to the end of the said sounding post by means of a universal joint.

2. An engineer's stethoscope as set forth in claim 1, comprising a bearing piece fastened to the outside of one casing half, and forming the fulcrum for the said bell-crank lever.

In testimony whereof I have signed my name to this specification in the presence of two subscribing witnesses.

RICHARD BATCHELOR FOORD.

Witnesses:
  H. CAPLEN,
  H. D. CAPLEN.